(12) United States Patent
Ng et al.

(10) Patent No.: US 6,351,445 B1
(45) Date of Patent: Feb. 26, 2002

(54) OPTICAL PICKUP DEVICE

(75) Inventors: Yeong Ling Ng; Ryosuke Tsuru, both of Singapore (SG)

(73) Assignee: Sony Electronic (Singapore) PTE, Ltd., Singapore (SG)

( * ) Notice: Subject to any disclaimer, the term of this patent is extended or adjusted under 35 U.S.C. 154(b) by 0 days.

(21) Appl. No.: 09/533,503

(22) Filed: Mar. 23, 2000

(30) Foreign Application Priority Data

Mar. 24, 1999 (SG) .......................................... 9901327-8

(51) Int. Cl.$^7$ .............................................. G11B 17/30
(52) U.S. Cl. ...................................................... 369/219
(58) Field of Search ................................. 369/215, 219, 369/44.14; 359/813

(56) References Cited

U.S. PATENT DOCUMENTS 5,189,660 A * 2/1993 Caldwell ..................... 369/215
5,493,546 A * 2/1996 Kasahara ................. 369/44.15

* cited by examiner

Primary Examiner—George J. Letscher
(74) Attorney, Agent, or Firm—Frommer Lawrence & Haug LLP; William S. Frommer (57) ABSTRACT

A sliding base 7 is supported over main guide shaft 27 and auxiliary guide shaft 28, and has first and second bearings 31 and 32 supported on the main guide shaft 27, and a third bearing 33 supported on the auxiliary guide shaft 28. The third bearing 33 has a fulcrum $P_3$ thereof positioned on a straight line $L_1$ connecting a middle point $P_4$ connecting fulcrums $P_1$ and $P_2$ of the first and second bearings 31 and 32, and a center of gravity $G_1$ of the sliding base 7 supporting an optical block 5 and objective lens drive 6 thereon. Thus, sliding base 7 can be presented from being vibrated.

3 Claims, 6 Drawing Sheets

OPTICAL PICKUP DEVICE

BACKGROUND OF THE INVENTION

1. Field of the Invention

The present invention relates to an optical pickup device which writes and/or reads information to and/or from an optical disc or magneto-optical disc.

2. Description of Related Art

Various optical pickup devices have been proposed and widely used to write and/or read information to and/or from an optical disc, for example. An optical pickup device of this kind comprises an optical block including an objective lens to focus a laser light on a signal recording area of an optical disc, an objective lens drive to move the objective lens in a focusing direction parallel to the optical axis of the objective lens and a tracking direction orthogonal to the optical disc of the objective lens, and a sliding base to support the optical block and objective lens drive thereon.

The optical block includes a light source to emit a laser light, the objective lens to focus the laser light onto the signal recording area of the optical disc, a photodetector to detect a return light from the signal recording area of the optical disc, various lenses, etc. The objective lens drive comprises a lens holder to hold the objective lens, a supporting base to support the lens holder movably in the focusing and tracking directions, and a biaxial actuator to move the lens holder in the focusing and tracking directions.

The sliding base is supported movably on first and second guide shafts disposed in parallel to each other, and moved radially of the optical disc by means of a sliding base driving mechanism. The sliding base includes a mount plate on which the optical block and objective lens drive are installed, first and second bearings supported on the first guide shaft, and a third bearing supported on the second guide shaft.

In the optical pickup device constructed as in the above, as the sliding base is moved on and along the first and second guide shafts, the objective lens is moved radially of the optical disc to a position corresponding to a desired recording track on the optical disc. Further in this optical pickup device, the objective lens drive moves the objective lens in the focusing and tracking directions, the laser light irradiated through the objective lens via the optical block is focused on the signal recording area of the optical disc, and a return light from the signal recording area is detected to read information written on the optical disc.

However, the conventional optical pickup is disadvantageous in that when information is read from an optical disc, the sliding base itself is moved and the objective lens drive and optical disc spinning drive mechanism in operation are mechanically vibrated, thus causing the sliding base to resonate with the mechanical vibration.

To suppress such vibration in the conventional optical pickup device, a massive piece is disposed in a predetermined position on the sliding base to shift the resonance frequency band or reduce the amplitude of the vibration.

However, the provision of the massive piece adds to the number of parts in the conventional pickup device, the material and manufacturing costs, the total weight of the optical pickup device, and also to the structural limitation which will make it difficult to freely design an optical pickup device.

Figure 1:
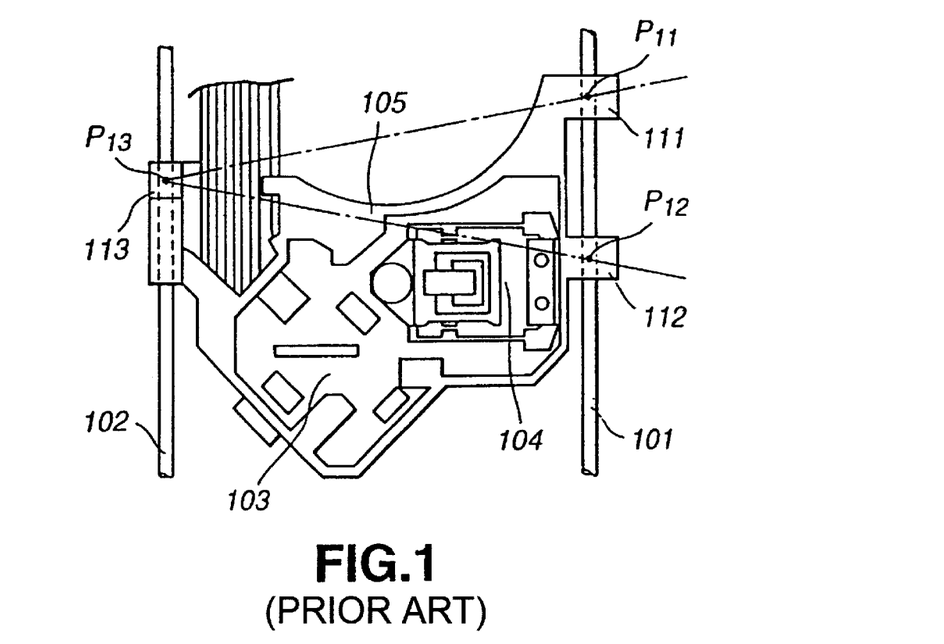
FIG. 1 is a plan view of a conventional optical pickup device.

The Japanese Published Unexamined Patent Application No. 9-180201 discloses an optical pickup device using a sliding base improved to cope with the above-mentioned vibration problem. FIG. 1 is a plan view of this conventional optical pickup device. As shown, the optical pickup device includes a sliding base 105 supporting an optical block 103 and objective lens drive 104 thereon. The sliding base 105 is provided with a first bearing 111 and a second bearing 112, both supporting together a first guide shaft 101, and a third bearing 113 supporting a second guide shaft 102.

In the sliding base 105, the third bearing 113 has a fulcrum $P_{13}$ thereof positioned to define an isosceles triangle together with a fulcrum $P_{11}$ of the first bearing 111 and a fulcrum $P_{12}$ of the second bearing, with a segment connecting the fulcrums $P_{11}$ and $P_{12}$ taken as the base of the isosceles triangle, in order to suppress the above-mentioned vibration. Further, the sliding base 105 supporting the optical block 103 and objective lens drive 104 thereon has a center of gravity thereof positioned on the bisector orthogonal to the base of the isosceles triangle to further reduce the vibration.

However, if the center of gravity of the sliding block 105 is located outside the triangle defined by the fulcrums $P_{11}$, $P_{12}$ and $P_{13}$ of the first, second and third bearings 111, 112 and 113, respectively, the vibration cannot be reduced effectively or it will increase since the triangle is an isosceles one.

Figure 2:
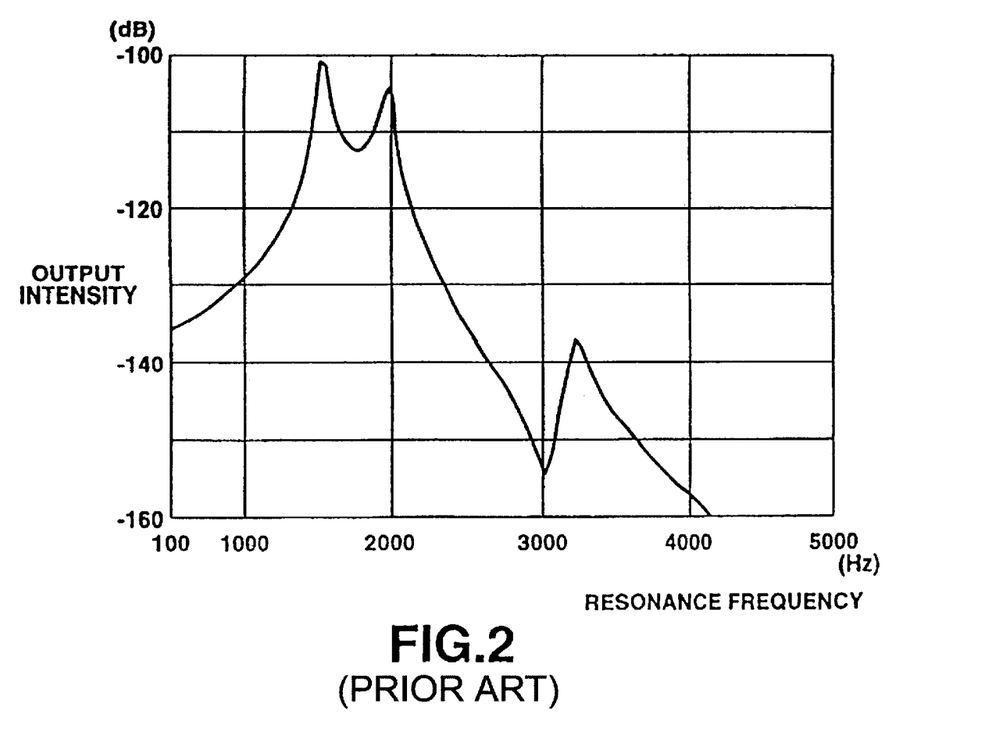
FIG. 2 graphically shows the resonance characteristic of the conventional optical pickup device in FIG. 2.

The resonance characteristic of the conventional optical pickup device in FIG. 1 is shown in FIG. 2 in which the horizontal axis indicates a resonance frequency and the vertical axis indicates an output intensity. As seen from FIG. 2, output peaks are included within a band ranging from 1,000 to 4000 Hz, which is not advantageous for the optical pickup device.

SUMMARY OF THE INVENTION

According, the present invention has an object to overcome the above-mentioned drawbacks of the prior art by providing an optical pickup device capable of suppressing the resonance taking place in a sliding base thereof The above object can be achieved by providing an optical pickup device comprising, according to the present invention:

an optical system including an objective lens;

an objective lens drive including a holder to support the objective lens, a member to support the lens holder movably in a first direction parallel to the optical axis of the objective lens and a second direction perpendicular to the optical axis of the objective lens, and means for driving to move the lens holder in the first and second directions; and a sliding base to support the optical system and objective lens drive.

The sliding base is supported over first and second guide shafts disposed in parallel to each other, and has a plurality of main bearings supported on the first guide shaft and an auxiliary bearing supported on the second guide shaft.

The auxiliary bearing is disposed to have a fulcrum thereof positioned on a straight line connecting a middle point of a segment connecting fulcrums of the plurality of main bearings positioned at opposite axial ends of the first guide shaft, and the center of gravity of the sliding base supporting the optical system and objective lens drive thereon.

In the optical pickup device as constructed as in the foregoing, the middle point of the segment connecting the fulcrums of the plurality of main bearings positioned at opposite axial ends of the first guide shaft, is positioned on the center of gravity of the sliding base supporting the optical system and objective lens drive thereon, so that the sliding base can be inhibited from resonating. It should be noted that the fulcrums and center of gravity refer to projected points on a same plane for the simplicity of illustration and explanation.

These objects and other objects, features and advantages of the present intention will become more apparent from the following detailed description of the preferred embodiment of the optical pickup device according to the present invention when taken in conjunction with the accompanying drawings.

DETAILED DESCRIPTION OF THE PREFERRED EMBODIMENTS

Figure 3:
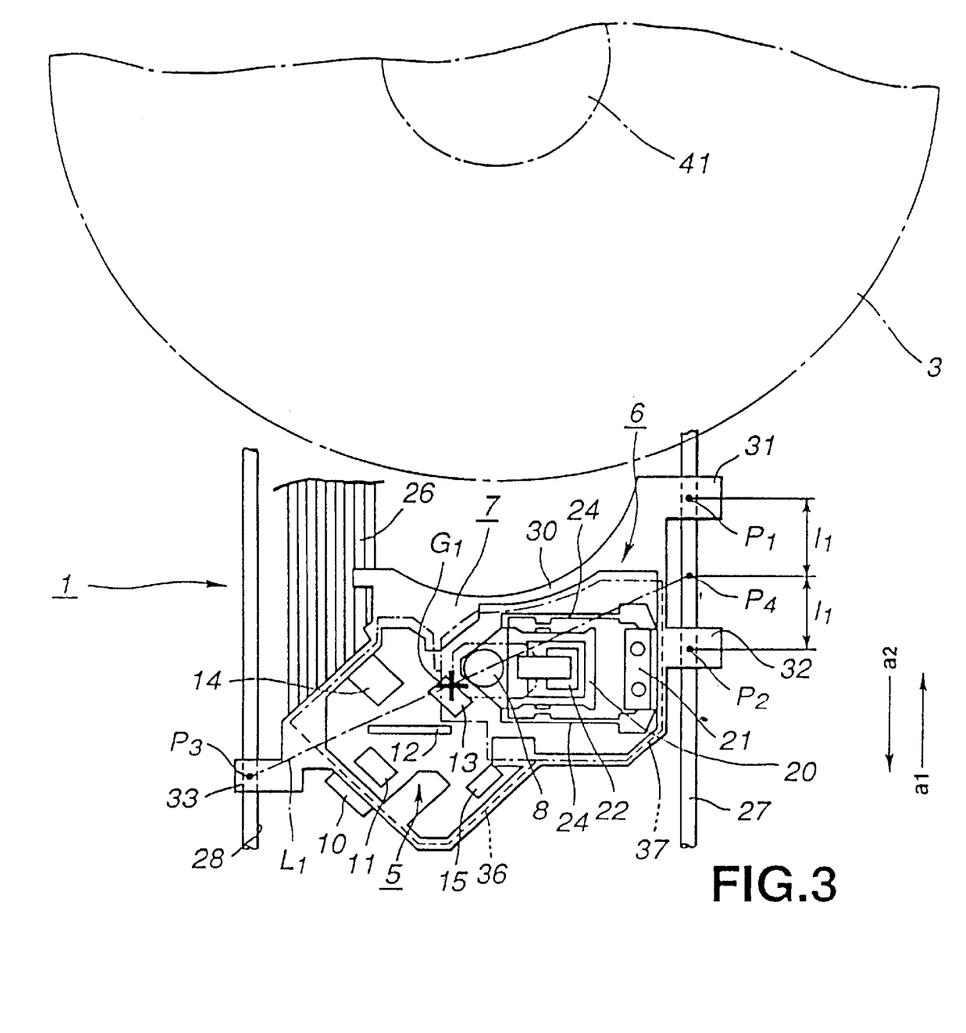
FIG. 3 is plan view of an optical pickup device according to the present invention.

Referring now to FIG. 3, there is illustrated in the form of a plan view the optical pickup device according to the present invention. The optical pickup device is generally indicated with a reference 1. The optical pickup device 1 comprises an optical block 5 including an objective lens 8, an objective lens drive 6 to drive to move the objective lens 8 in a focusing direction parallel to the optical axis of the objective lens 8 and a tracking direction perpendicular to the optical axis of the objective lens 8, and a sliding base 7 supporting the optical block 5 and objective lens drive 6 thereon.

As shown in FIG. 3, the optical block 5 is disposed on the sliding base 7, and comprises a light source 14 to emit a laser light, a half mirror 12 to split the laser light into beams, a collimator lens 13 to make split laser beams parallel to each other, an objective lens 8 to focus the laser beam on a signal recording area of an optical disc 3, a condenser lens 11 to condense a return light from the optical disc 3, a photodetector 10 to detect the return light from the optical disc 3, and a power monitor 15 to detect a part of the laser light and control the output of the light source 14.

As shown in FIG. 3, the objective lens drive 6 comprises a lens holder 20 disposed on the sliding base 7 to hold the objective lens 8, a supporting member 21 to support the lens holder 20 movably in the focusing and tracking directions, and a biaxial actuator 22 to drive to move the lens holder biaxially, that is, in the focusing and tracking directions.

The lens holder 20 has the objective lens 8 provided in an opening formed in the main surface thereof, and it is supported at ends of a plurality of elastic wires 24. The supporting member 21 is fixed to the sliding base 7 and supports the other ends of the plurality of elastic wires 24.

The supporting member 21 supports the lens holder 20 movably by the plurality of elastic wires 24 in each of the focusing and tracking directions. The biaxial actuator 22 comprises focusing and tracking coils, driving magnets to develop electromagnetic force in the respective coils, and yokes to provide magnetic circuits (these component are not illustrated). The objective lens drive 6 is electrically connected to a power supply (not shown) via a flexible wiring board 26 as shown in FIG. 3.

In the above-mentioned objective lens drive 6, the lens holder 20 is supported by the elastic wires 24. Namely, this construction may be called a wire-supported type. However, the lens holder 20 may of course be driven to move axially of, and about, a sliding pivot provided nearly at the center of the lens holder. This construction may be called a slide-and-pivot type.

Figure 4:
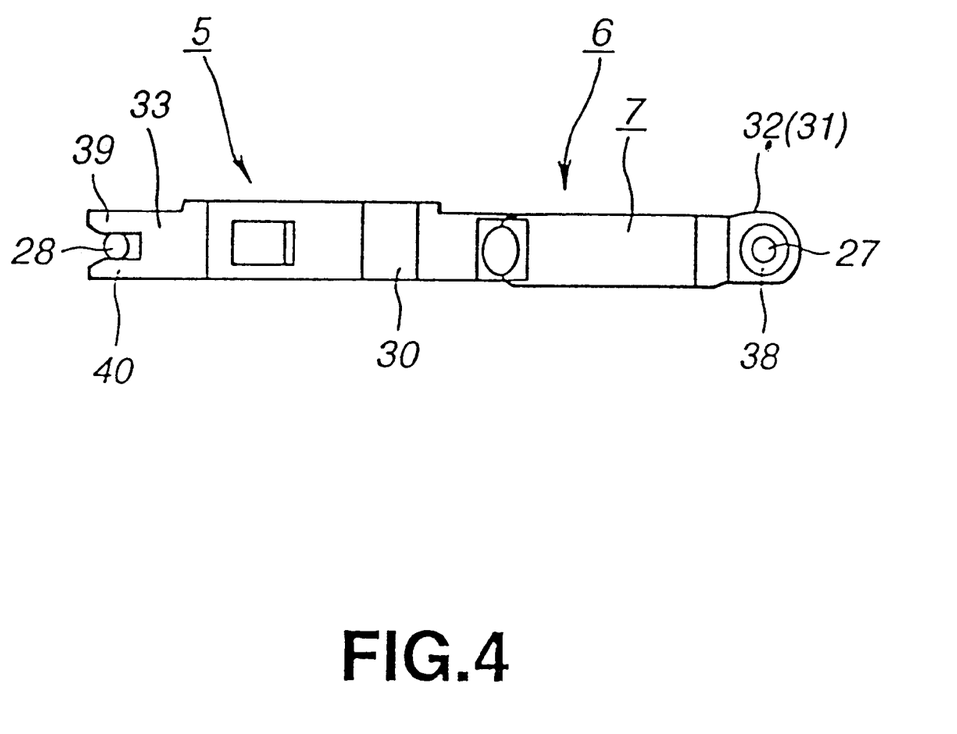
FIG. 4 is a side elevation of a sliding base included in the optical pickup device in FIG. 3.

The sliding base 7, an essential part of the present invention, is supported over a main guide shaft 27 and an auxiliary guide shaft 28, disposed parallel to each other, as shown in FIGS. 3 and 4, to be movable by a driving mechanism (not shown) in the directions of arrows $a_1$ and $a_2$ parallel to the radius of the optical disc 3 as shown.

As seen from FIGS. 3 and 4, the sliding base 7 comprises a mount plate 3 made of die-cast aluminum, for example, and on which the optical block 5 and objective lens drive 6 are installed, a first bearing 31 and second bearing 32 supported over the main guide shaft 27, and a third bearing 33 supported on the auxiliary guide shaft 28.

As shown in FIGS. 3 and 4, the mount plate 30 of the sliding base 7 has, on the main surface thereof, a first mounting area 36 on which the optical block 5 is installed, and a second mounting area 37 on which the optical lens drive 6 is installed. The first mounting area 36 is located adjacent to the auxiliary guide shaft 28 of the mount plate 30. The second mounting area 37 is located adjacent to the main guide shaft 27 of the mount plate 30 and has fixed thereon the supporting member 21 of the objective lens drive 6.

The first bearing 31 of the sliding base 7 is formed integrally with the mount plate 30 and projected in a direction perpendicular to the axis of the main guide shaft 27. The second bearing 32 is formed integrally with the mount plate 30 at a predetermined distance $21_1$ from the first bearing 31 and projected in a direction perpendicular to the axis of the main guide shaft 27. The third bearing 33 is formed integrally with the mount plate 30 and projected in a direction perpendicular to the axis of the auxiliary guide shaft 28.

As shown in FIG. 4, the first and second bearings 31 and 32 have provided through them a bearing member 38 in which the main guide shaft 27 is supported. The third bearing 33 has first and second projecting abutments 39 and 40 formed integrally therewith and opposite to each other, between which the auxiliary guide shaft 28 is supported.

The geometric relation among the first to third bearings 31, 32 and 33 thus formed of the sliding base 7 will be described with reference to FIGS. 3 and 5:

As shown, the first bearing 31 has a fulcrum $P_1$ (will be referred to as "fulcrum $P_1$ of first bearing 31" hereinunder) positioned at the axial center of the main guide shaft 27. The second bearing 32 has a fulcrum $P_2$ (will be referred to as "fulcrum $P_2$ of second bearing 32" hereinunder) positioned at the axial center of the main guide shaft 27. The third bearing 33 has a fulcrum $P_3$ (will be referred to as "fulcrum $P_3$ of third bearing 33" hereinunder) positioned at the axial center of the auxiliary guide shaft 28.

Figure 5:
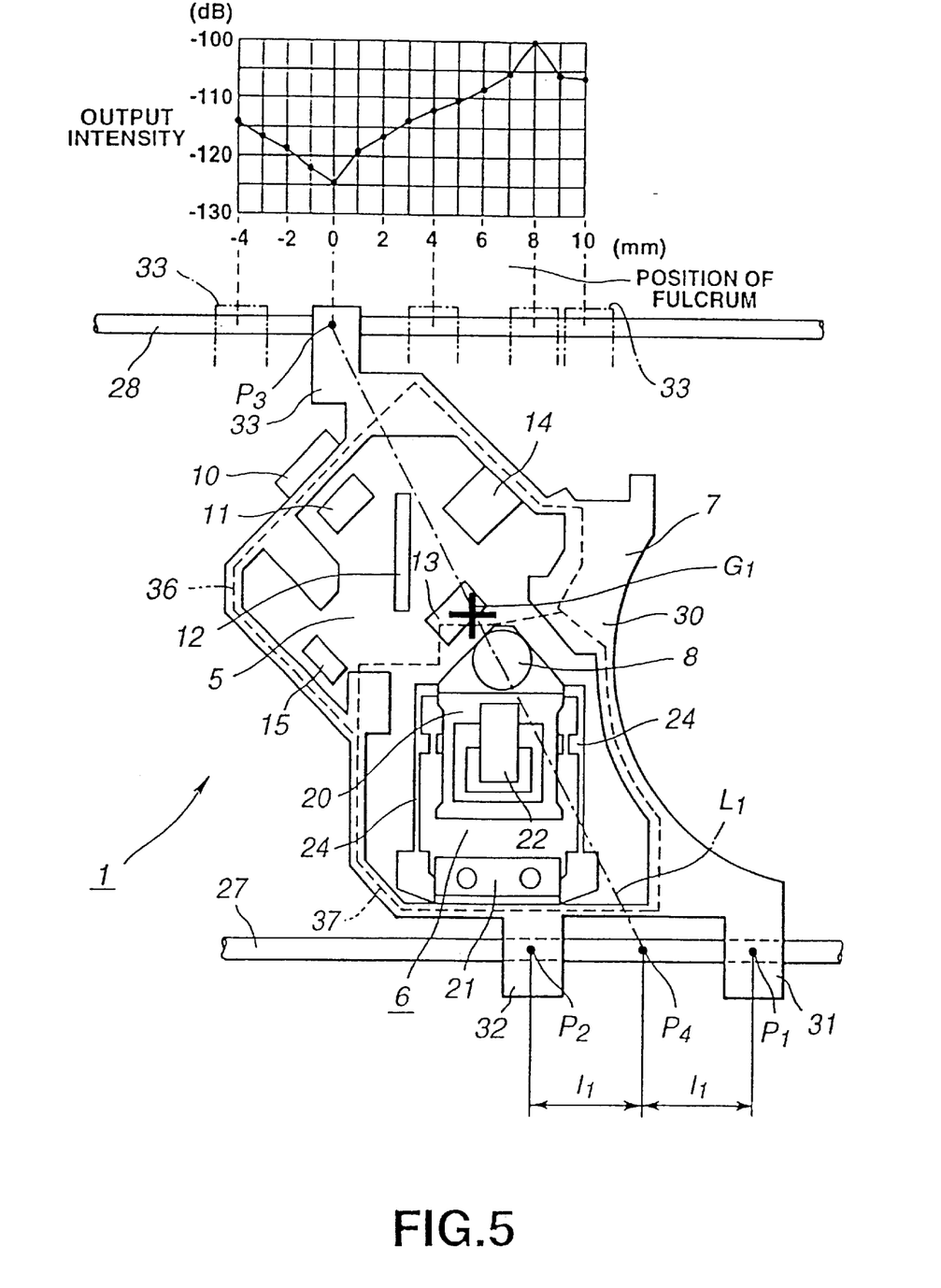
FIG. 5 is a plan view for explanation of the positioning of the sliding base and third bearing in the optical pickup in FIG. 3.

As will be seen from FIGS. 3 and 5, the third bearing 33 has the fulcrum $P_3$ positioned on a straight line $L_1$ connecting a middle point $P_4$ of a segment connecting the fulcrums $P_1$ and $P_2$ of first and second bearings 31 and 32, and the center of gravity $G_1$ of the sliding base 7 having the optical block 5 and objective lens drive 6 installed thereon.

Note that the above-mentioned fulcrums $P_1$, $P_2$, $P_3$, $P_4$ and center of gravity $G_1$ refer to projected points on a same plane generally parallel to the main surface of the sliding base 7 for the simplicity of illustration and description.

As in the foregoing, the sliding base 7 has the first and second bearings 31 and 32 to support the main guide shaft 27. However, another bearing should preferably be formed between the first and second bearings 31 and 32 to support the main guide shaft 27 from the purpose of resonance suppression.

The fulcrums $P_1$ and $P_2$ of first and second bearings 31 and 32 are formed spaced a distance $21_1$ from each other. For the purpose of resonance suppression, however, the distance $21_1$ should preferably be larger.

Figure 6:
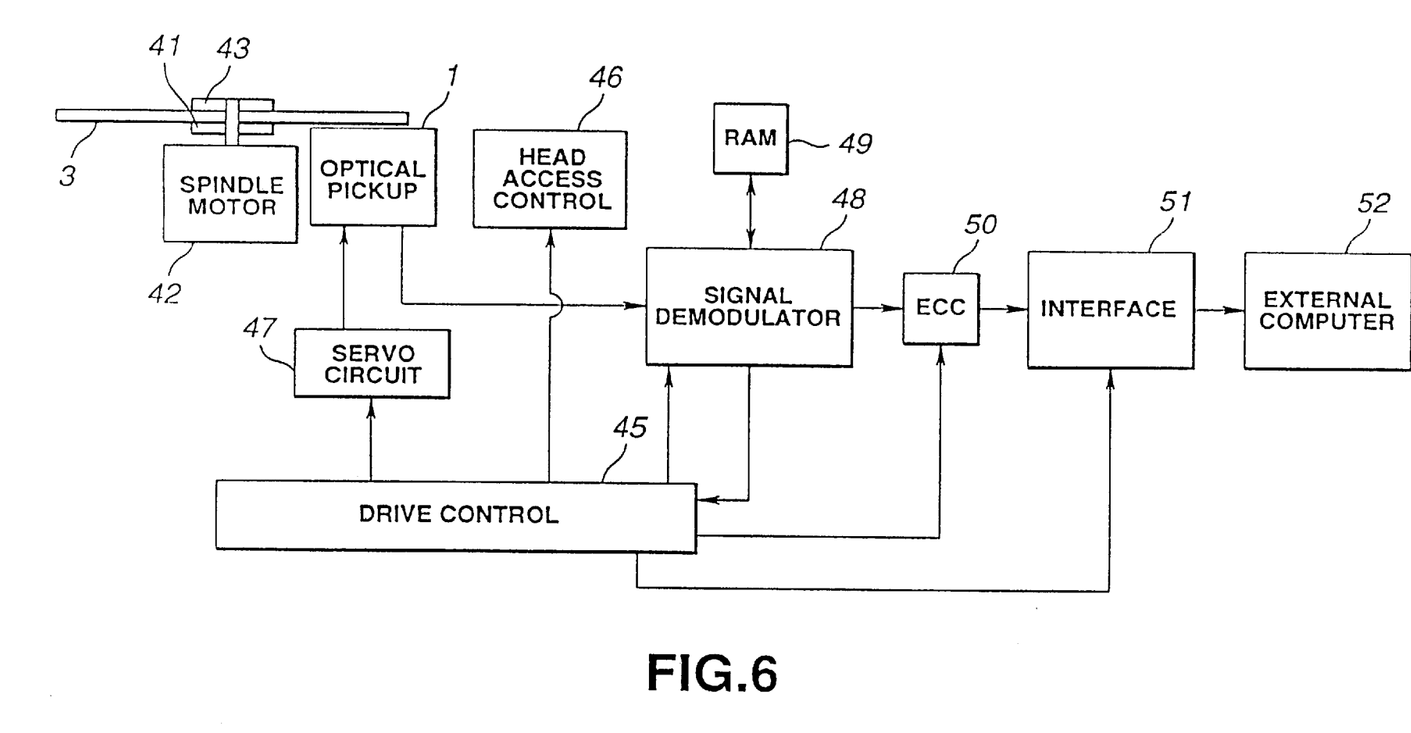
FIG. 6 is a schematic block diagram of the optical pickup device in FIG. 3, showing the signal processing in the optical pickup device.

The optical pickup device 1 constructed as mentioned in the foregoing effects a signal processing to read information from the optical disc 3 as will be described below:

As schematically shown in FIG. 6, the optical disc drive incorporating the optical pickup device 1 comprises a disc spinning mechanism including a disc table 41 on which the optical disc 3 is set, a spindle motor 42 to drive to spin the disc table 41, and a clamping member 43 to retain the optical disc 3 set on the disc table 41.

As seen from FIG. 6, the optical disc 3 is set on the disc table 41 of the spindle motor 42 while being retained on the disc table 41 by the clamping member 43. The spindle motor 42 is controlled by the drive controller 45 to run at a predetermined speed.

The optical pickup device 1 is connected to a head access controller 46 which moves the optical pickup device 1, by seeking operation, to a desired recording track on the optical disc 3. Also, the optical pickup device 1 is connected to a servo circuit 47 which provides to the biaxial actuator 22, which moves the objective lens 8 biaxially with respect to the recording track, a servo signal under which the optical pickup device 1 having been moved to the desired recording track on the optical disc 3 is moved in the tracking and focusing directions.

The optical pickup device 1 focuses a laser light on a signal recording area on the optical axis 3 and detects a return light from the signal recording area, to generate a read signal based on the return light and provide it to a signal demodulator 48. The signal demodulator 48 is connected to a RAM (random access memory) 49 which provisionally stores a signal yet to demodulate, and demodulates the read signal from the RAM 49. The signal demodulator 48 provides a control signal from the spindle motor 42 to the drive controller 45. The read signal demodulated by the signal demodulator 48 has an error corrected by an ECC (error correction code) circuit 50 and is provided to an external computer 52 or the like via an interface 51.

Figure 7:
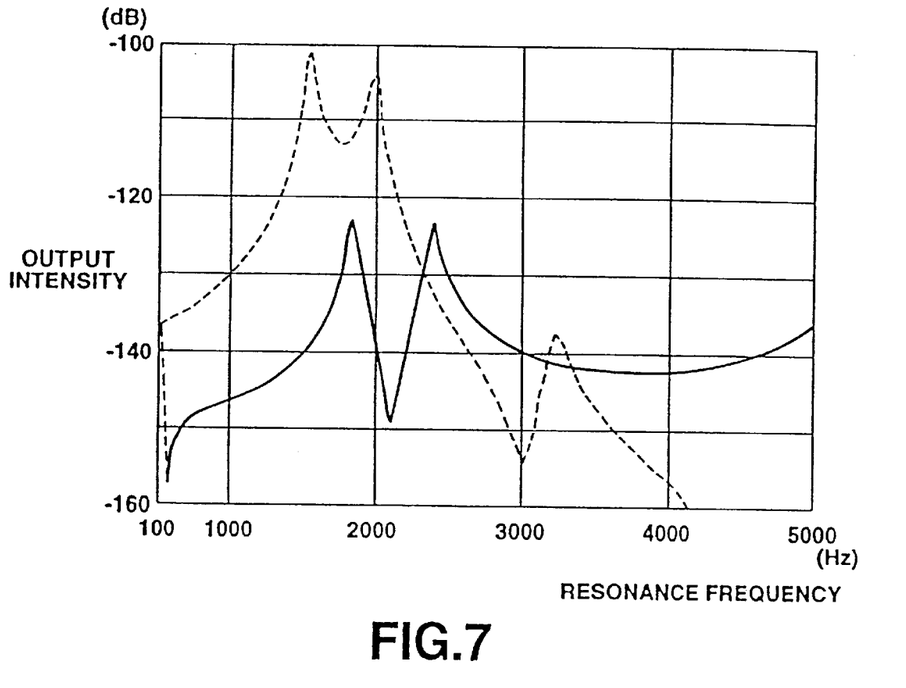
FIG. 7 graphically shows the resonance characteristic of the optical pickup device in FIG. 3.

The resonance frequency characteristic of the optical pickup device 1 having been described in the foregoing will be described with reference to FIG. 7. In FIG. 7, the horizontal axis indicates a resonance frequency (Hz) and vertical axis indicates an output intensity (dB). It should be noted that in FIG. 7, the resonance characteristic of the optical pickup device 1 is indicated with a solid line while that of the conventional optical pickup device in FIG. 1 is indicated with a dash line.

As seen from FIG. 7, the resonance output intensity is considerably reduced in a frequency band of about 100 to 5,000 Hz. More particularly, the resonance output intensity is further remarkably reduced in the bandwidth of about 500 to 2,000 Hz. In the optical pickup device 1 according to the present invention, a plurality of peaks in the band of 1,000 to 4,000 Hz, the resonance of a frequency within this bandwidth proved to affect much the operation of the optical pickup device, is reduced and the maximum value of the resonance output intensity can be reduced by about 25 dB as will be seen from FIG. 7.

As shown in FIG. 5, the third bearing 33 formed on the sliding base 7 will have the resonance output intensity) thereof gradually increased as the fulcrum $P_3$ is moved in the positive-going and negative-going directions from a reference position on the straight line $L_1$ connecting the middle point $P_4$ and center of gravity $G_1$ along the axis of the auxiliary guide shaft 28. Therefore, when the third bearing 33 is formed in such a manner that the fulcrum $P_3$ is positioned on the straight line $L_1$, the resonance output intensity can be reduced.

The optical pickup device 1 having the aforementioned construction functions to read information from the optical disc 3 as will be described below:

In the optical pickup device 1, as the sliding base 7 is moved axially of the main and auxiliary guide shafts 47 and 48, the objective lens 8 is moved radially of the optical disc 3, so that the objective lens 8 is moved to a position corresponding to a desired recording track in the signal recording area of the optical disc 3. As the lens holder 20 in the optical pickup device 1 is moved by the biaxial actuator 22, the objective lens 8 is moved in the focusing and tracking directions with respect to the recording track on the optical disc 3, the laser light irradiated through the objective lens 8 is focused on the desired recording track, and a return light from the signal recording area of the optical disc 3 is detected to read information recorded in the optical disc 3.

It should be noted that the optical disc device 1 may have a massive piece disposed on the sliding base to adjust the position of the center of gravity. There will be described with reference to FIG. 8 a variant of the optical head according to the present invention in which a massive piece is disposed on the sliding base so that the center of gravity of the sliding base is positioned on a straight line connecting the middle point of a segment connecting fulcrums of the plurality of main bearings positioned at opposite axial ends of the first guide shaft and the fulcrum of the auxiliary bearing. It should be noted that same members as those used in the aforementioned optical pickup device 1 are indicated with same references and will not further be described.

Figure 8:
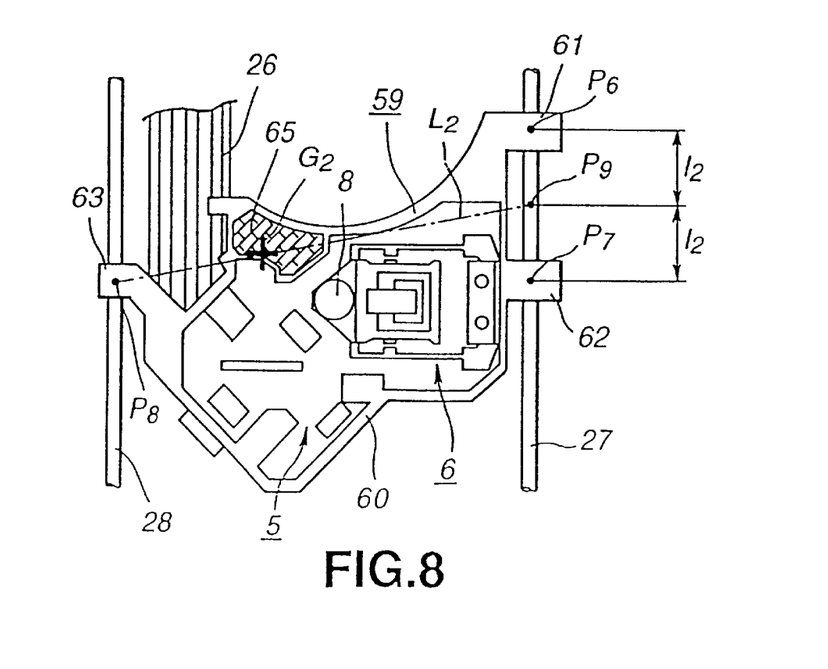
FIG. 8 is a plan view of a variant of the sliding base used in the optical pickup device in FIG. 3.

In FIG. 8, a sliding base is generated indicated with a reference 59. The sliding base 59 has a mount plate 60 having the optical block 5 and objective lens drive 6 installed thereon, first and second bearings 61 and 62 supported on the main guide shaft 27, and a third bearing 63 supported on the auxiliary guide shaft 28.

The first bearing 61 is formed integrally with the mount plate 60 and projected in a direction perpendicular to the axis of the main guide shaft 27. The second bearing 62 is formed integrally with the mount plate 60 at a predetermined distance $21_2$ from the first bearing 61 and projected in a direction perpendicular to the axis of the main guide shaft 27. The third bearing 63 is formed integrally with the mount plate 60 and projected in a direction perpendicular to the axis of the auxiliary guide shaft 28.

The geometric relation among the first to third bearings 61, 62 and 63 thus formed of the sliding base 59 will be described with reference to FIG. 8:

As shown, the first and second bearings 61 and 62 have fulcrums $P_6$ and $P_7$ with respect to the main guide shaft 27. The third bearing 63 has a fulcrum $P_8$ with respect to the auxiliary guide shaft 28. The third bearing 63 is formed to have the fulcrum $P_8$ positioned on a straight line $L_2$ connecting a middle point $P_9$ of a segment connecting the fulcrum $P_6$ of the first bearing 61 and the fulcrum $P_7$ of the second bearing 62, and the center of gravity $G_2$ of the sliding base 59 having optical block 5 and objective lens drive 6 installed thereon.

Further, the sliding base 59 has disposed thereon a massive piece 65 made of a nonmagnetic metal plate or the like, for example, as shown in FIG. 8 so that the center of gravity $G_2$ is positioned on a straight line $L_2$ connecting the middle point $P_9$ and fulcrum P8 of the third bearing.

As having previously been described, since the third bearing 33 of the sliding base 7 is formed to have the fulcrum $P_3$ positioned on the straight line $L_1$ passing through the center of gravity $G_1$, the optical pickup device 1 is capable of reducing the resonance without the necessity of any additional part, any additional working and without leading to a larger design of the whole device. Since the optical pickup device 1 is capable of reducing the resonance within itself, no resonance will adversely affect any other parts of an optical disc drive in which the optical pickup device 1 is incorporated. Further, the optical pickup device 1 can operate to read information from the optical disc 3 with an improved reliability.

The optical pickup device according to the present invention is adapted to read an optical disc. With a magnetic head, for example, disposed opposite the objective lens, the optical pickup device may of course be adapted to write and read information with respect to another optical disc such as a magneto-optical disc.

As having been described in the foregoing, the optical pickup device according to the present invention can suppress the resonance taking place in the sliding base on which the optical block and objective lens are provided.

What is claimed is:

1. An optical pickup device, comprising:

an optical system including an objective lens;

an objective lens drive including a holder to support the objective lens, a member to support the lens holder movably in a first direction parallel to the optical axis of the objective lens and a second direction perpendicular to the optical axis of the objective lens, and means for driving to move the lens holder in the first and second directions; and a sliding base supporting the optical system and objective lens drive;

the sliding base being supported over first and second guide shafts disposed in parallel to each other and having a plurality of main bearings supported on the first guide shaft and an auxiliary bearing supported on the second guide shaft; and the auxiliary bearing being disposed to have a fulcrum thereof positioned on a straight line connecting a middle point of a segment connecting fulcrums of the plurality of main bearings positioned at opposite axial ends of the first guide shaft and the center of gravity of the sliding base supporting the optical system and objective lens drive thereon.

2. The optical pickup device as set forth in claim 1, wherein the sliding base has first and second bearings supported on the first guide shaft, and a third bearing supported on the second guide shaft.

3. The optical pickup device as set forth in claim 1, wherein the sliding base has a massive piece disposed thereon so that the center of gravity of the sliding base is positioned on a straight line connecting the middle point of a segment connecting fulcrums of the plurality of main bearings positioned at opposite axial ends of the first guide shaft and the fulcrum of the auxiliary bearing.

* * * * *